United States Patent [19]

Lynch et al.

[11] Patent Number: 5,077,622

[45] Date of Patent: Dec. 31, 1991

[54] APPARATUS FOR PRECISION FOCUSSING AND POSITIONING OF A BEAM WAIST ON A TARGET

[75] Inventors: Dana H. Lynch, San Francisco; William D. Gunter, San Jose; Kenneth W. McAlister, Santa Clara, all of Calif.

[73] Assignee: The United States of America as represented by the Administrator of the National Aeronautics and Space Administration, Washington, D.C.

[21] Appl. No.: 531,373

[22] Filed: May 31, 1990

[51] Int. Cl.$^5$ .......................... G02B 7/02; G02B 27/64
[52] U.S. Cl. .................................... 359/813; 359/557; 359/819
[58] Field of Search ....................... 350/409, 247, 252; 359/813, 819, 557

[56] References Cited

U.S. PATENT DOCUMENTS 4,781,445 11/1988 Baba et al. ................... 350/247 X

OTHER PUBLICATIONS

Harrison, R. W.; "Beam Director with Independent Adjustments", *IBM Tech. Discl. Bulletin*; vol. 14, No. 12; May 1972; pp. 3815-3816; 350/247.

Primary Examiner—Scott J. Sugarman
Attorney, Agent, or Firm—Darrell G. Brekke; Harold W. Adams; John R. Manning

[57] ABSTRACT

A beam focusing and positioning apparatus provides focusing and positioning the final waist of a gaussian beam at a desired location on a target such as an optical fiber. The apparatus includes a first lens, having a focal plane $f_1$, disposed in the path of an incoming beam and a second lens, having a focal plane $f_2$ and being spaced downstream from the first lens by a distance at least equal to $f_1 + 10f_2$, which cooperates with the first lens to focus the final waist of the beam on the target. A rotatable optical device, disposed upstream of the first lens, adjusts the angular orientation of the final beam waist by a parallel displacement of the beam at said optical device. The transverse position of the first lens relative to the axis of the beam is varied to control the transverse position of the final beam waist relative to the target while the relative axial positions of the lenses are varied to control the diameter of the final beam waist and to control the axial position of the final beam waist.

20 Claims, 3 Drawing Sheets

APPARATUS FOR PRECISION FOCUSSING AND POSITIONING OF A BEAM WAIST ON A TARGET

FIELD OF THE INVENTION

The invention relates to optical focussing apparatus and, more particularly, to optical apparatus, for focussing a highly collimated Gaussian beam, which provides independent and fine control over the focus waist diameter, the focus position both along the beam axis and transverse to the beam, and the focus angle.

BACKGROUND ART

As discussed below, the purpose of this invention is, in general, to deliver a beam having a very small waist at normal incidence into a target. Although it is to be understood that the invention is not limited to such an application the invention is particularly adapted to provide proper launching of a laser beam into a target in the form of the core of a polarization-preserving optical fiber. Seven adjustments ar generally necessary to achieve this, and, in particular, these seven adjustments comprise adjustment of: (i) the beam polarization; (ii) the diameter of the beam waist at the target (the optical fiber core); (iii) the relative axial (z) position of the beam waist with respect to the optical target; (iv) the relative transverse (x) position of the beam waist with respect to the optical fiber; (v) the relative transverse (y) position of the beam waist with respect to the optical target; (vi) the input angle in the horizontal plane; and (vii) the input angle in the vertical plane.

Turning to a consideration of the prior art, one approach for launching a laser beam into an optical fiber involves the use of a single lens having a focal length chosen to provide a beam having an output waist of the proper diameter to match the input waist requirement of the fiber. However, such an approach, i.e., one using a single lens, provides none of the seven required adjustments discussed above. Therefore, all adjustments, and the attendant requirements for resolution and stability, are entirely the burden of the associated mechanical system.

Considering other prior art in this field, Catalog No. 100 of The Newport Corporation, at page J-16, describes fiber couplers F-1015 and F-1015LD that are said to solve some of the difficulties with other prior art systems, by providing certain adjustments which are made optically. Both of the couplers referred to above use two optical elements, viz., a negative lens and a positive lens, to provide very accurate transverse positioning adjustments in the x and y directions, i.e., adjustments corresponding to adjustments (iv) and (v) above.

Considering other prior art systems it is noted that in those instances where the target can be mounted on a mechanical positioner, linear and angular adjustments can be accomplished with the required accuracy using piezoelectric manipulators. However, the expense of this approach is generally prohibitive.

In summary, prior art systems employing optical techniques to launch a laser beam into optical fiber or other target simply do not provide the necessary adjustments discussed above. In this regard, as stated, the Newport couplers provide only two of the required adjustments, while the single lens arrangement provides none.

There are, of course, many patents relating to positioning and/or focussing of laser energy and one patent of possible interest is U.S. Pat. No. 4,556,284 (Albersdoerfer et al) which discloses an apparatus for combining an optical and laser system and including a self-focussing optical fiber bundle the emitting surface of which is mounted so as to introduce the laser energy into the optical system at a favorable location.

SUMMARY OF THE INVENTION

In accordance with the invention, a system or apparatus is provided which enables precision focussing and positioning of the waist of a laser beam on a target such as the core of an optical fiber. More particularly, the invention provides all seven adjustments set forth above and does this in a highly efficient and effective manner. In this regard, with respect to the five most difficult adjustments required to correctly couple a laser beam into an optical fiber, all five are rendered less dependent of the resolution provided by the associated mechanical devices because of one or another aspect of the system optics. In other words, the resolution demanded of the mechanical adjustment devices needed to couple the laser beam into a target (such as an optical fiber) are relaxed because of the optical "leveraging" provided by the invention, together with other unique aspects thereof. As explained below, by taking advantage of what is referred to in the discussion hereinbelow as the convergence of Gaussian and geometric optics, i.e., by providing an optical setup which is constructed and arranged so as to conform to the equations of geometric optics despite the fact that the laser beam is of a Gaussian shape, this invention provides fine optical control of the beam angles independently of other beam parameters and without sacrificing fine optical control of the transverse motions of the beam.

According to the invention, there is provided a beam focusing and positioning apparatus for focusing and positioning a waist of a gaussian beam at a desired location on a target, the apparatus comprising: a first optical focusing means, disposed in the path of an incoming beam and through which the beam passes, for positioning the intermediate beam waist downstream thereof (or upstream in the case of a virtual waist of a negative first lens) and for controlling the transverse position of the final beam waist on the target; a second optical focusing means, disposed downstream of the first optical focusing means and through which the beam passes after passing through the first optical focusing means, for focusing the final waist of the beam on the target; and rotatable optical means, disposed upstream of the first optical focusing means, for adjusting the angular orientation of the final waist of the beam by parallel displacement of the beam at said optical means.

In a preferred embodiment, the first optical focusing means comprises a first lens, and means for adjusting the transverse position of the lens relative to the axis of the incoming beam to control the transverse position of the final waist of the beam relative to the target. Further, in accordance with this embodiment, the second focusing means comprises a second lens, and the overall apparatus comprises means for adjusting the spacing between the lenses to control the diameter of the final waist of the beam.

In an advantageous embodiment of the invention, the means for adjusting the spacing between the lenses comprises means for moving the first lens axially with respect to the second lens. In a further preferred embodiment, the apparatus includes means for moving the second lens relative to the first lens to control the axial position of the final waist of the beam relative to said target. Advantageously, the means for moving the second lens comprises a micrometer device.

In the embodiment of the invention employing lenses, the first lens can comprise a positive lens or a negative lens, while the second lens preferably comprises a positive lens.

In a preferred embodiment, the rotatable optical means comprises a pair of parallel surfaces which are rotated together. In an advantageous implementation of this embodiment, these parallel surfaces comprise the opposed planar surfaces of an optical window member. This optical window member preferably comprises a slab or block of glass.

A number of further important embodiments of the invention are described hereinafter, and other features and advantages of the invention will be set forth in, or apparent from, the detailed description of the preferred embodiments which follows.

DESCRIPTION OF THE PREFERRED EMBODIMENTS

Figure 1:
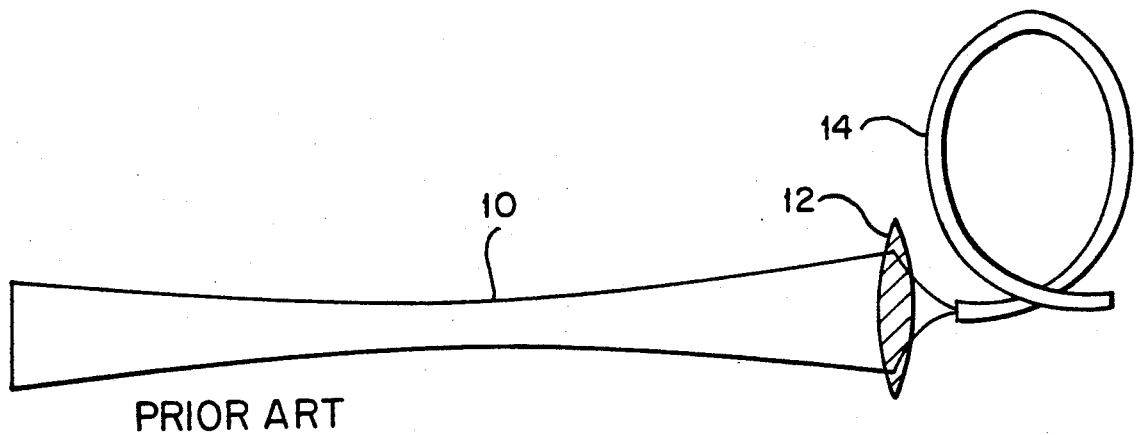
FIG. 1 is a schematic representation of a prior art optical system for focussing an incoming laser beam onto an optical fiber.

Before considering the present invention, certain preliminary matters require additional consideration. First, referring to FIG. 1, which is a schematic representation of the prior art single lens focussing system described above, an incoming beam 10 is focussed by a focussing lens 12 on one end of an optical fiber 14. As discussed above, with such an approach, all beam parameters must be controlled mechanically, if at all.

Figure 2A:
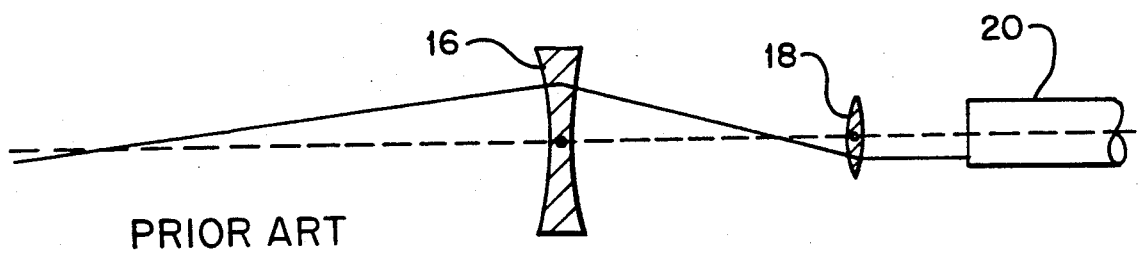
FIGS. 2(a) and 2(b) are schematic representations of a further prior art optical system which employs a pair of lenses and illustrates the effect of transverse movement of one of the lenses of that system.
Figure 2B:
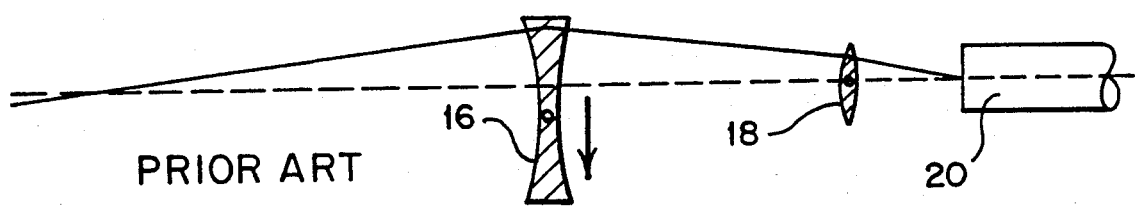

Continuing with these preliminary considerations and referring to FIGS. 2(a) and 2(b), which are schematic representations of a two lens system like that of the couplers made by the Newport Corporation and described above, the illustrated system includes a deflecting lens 16 and a focussing lens 18 used in focussing an incoming beam on a target 20 which, again, may be an optical fiber. As can be seen by comparing FIG. 2(b) with FIG. 2(a), vertical movement of lens 16, for example, controls the location of the beam on the target 20. As discussed above, such an approach offers precise optical control over transverse motions with coarse mechanical resolution, but at the expense of simultaneously changing the beam angle.

Figure 3A:
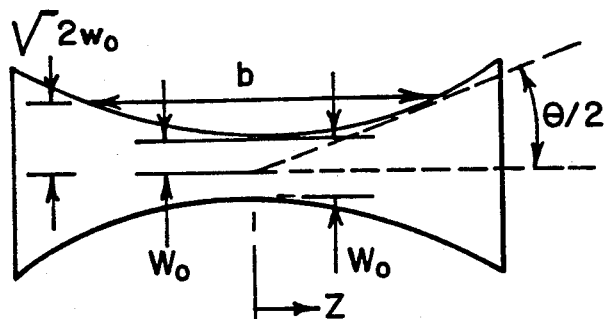
FIGS. 3(a), 3(b) and 4 are schematic representations of gaussian beams used in explaining the terminology employed in the description of the invention and the prior art.

Turning now to some new preliminary or background considerations, it is noted that the beams under consideration here are assumed to have a Gaussian shape, i.e., a shape as illustrated in FIG. 3(a). Accordingly, the power at any cross section of the beam has a Gaussian distribution. In the following discussion, W(z) represents the diameter of the beam and w(z) the radius of the beam, at a location along the beam axis (z) where the power has fallen to $e^{-2}$ of the value in the center of the beam. Further, the angle $\theta$ in FIG. 3(a) is the full angle at which the beam grows with distance in both directions from the beam waist. (The beam waist, of course, is located at the point where the beam reaches a minimum diameter). The diameter and radius of the beam at this location are denoted $W_0$ and $w_0$, respectively, in FIG. 3(a). With the wavelength being denoted $\lambda$, the following relationships can be derived:

$$W_o = \frac{4\lambda}{\pi\theta} \tag{1}$$

$$\theta = \frac{2\lambda}{\pi w_o} \tag{2}$$

$$W^2(z) = W_o^2 + (z\theta/2)^2 \tag{3}$$

The confocal parameter, denoted b, is defined as being twice the distance from the beam waist to the point where the diameter is $\sqrt{2}$ times larger than the diameter at the waist and can be determined from the following equation:

$$b = \frac{2\pi w_o^2}{\lambda} \tag{4}$$

Figure 3B:
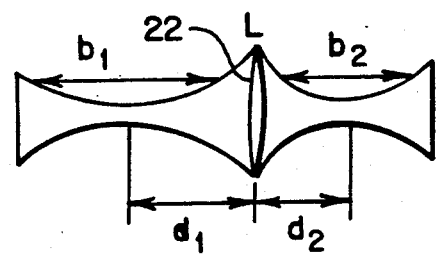

As illustrated in FIG. 3(b), the placing of a lens, denoted 22, in the path of a Gaussian beam will, of course, cause a new waist to be produced at a different location. If the lens has a focal length of f and the incoming beam has a confocal parameter of $b_1$ located at a distance $d_1$, in front of the lens, then the beam emerging from lens 22 will have a confocal parameter of $b_2$ located at a distance $d_2$ beyond lens 22, with $b_2$ and $d_2$ being defined by the following equations:

$$b_2 = \frac{b_1 f^2}{(d_1 - f)^2 + (b_1/2)^2} \tag{5}$$

$$d_2 = f + \frac{(d_1 - f)f^2}{(d_1 - f)^2 + (b_1/2)^2} \tag{6}$$

It is important to note a peculiar fact concerning the transformation of Gaussian beams. In general, the sizes of the beam waists and the distances to the waists will transform very differently when compared to the corresponding object and image sizes and distances associated with geometric optics. In geometric optics, when the object is located at one focal length from the lens, the image will be at infinity (as is evident from equation (7) below, which shows that when $d_1 = f$, then $d_2 = \infty$). In Gaussian optics, when the input beam waist is located at one focal length from the lens, the output waist will also be at one focal length from the lens. (This is evident from equation (6) above, wherein when $d_1 = f$, then $d_2 = f$). However, when the absolute value of the difference between the focal length and the input distance is much larger than the input confocal parameter, i.e., $|d_1 - f| > b_1$, the equation (6) for $d_2$ reduces to the geometric optics equation:

$$d_2 = f + \frac{f^2}{d_1 - f} \text{ or } \frac{1}{f} = \frac{1}{d_2} + \frac{1}{d_1} \quad (7)$$

The significance of this result is that when the condition $|d_1 - f| > b_1$ is satisfied, manipulation of the beam waist can be thought of in terms of the behavior and governing equations which are well known from classical geometric optics. (It has been recently discovered that this transformation is also described in S.A. Self, Applied Optics 22, pp. 658-661 (1983).)

Figure 4:
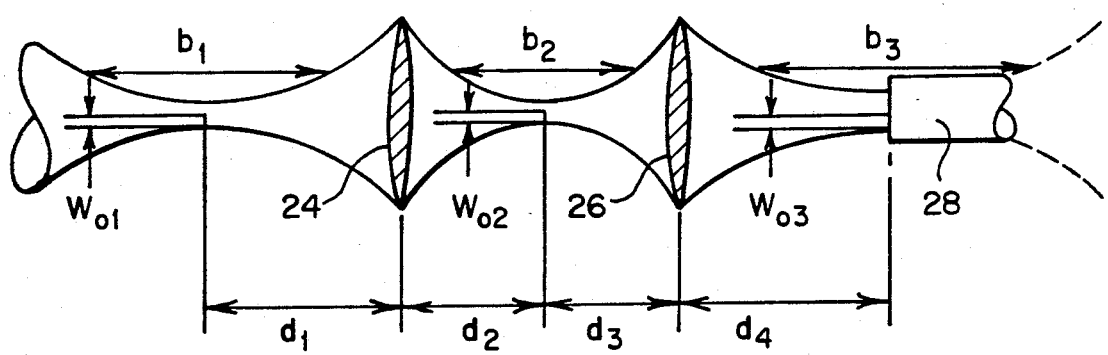

As discussed above, the present invention employs a pair of lenses and reference will now be made to FIG. 4 which shows lenses 24 and 26 positioned in front of a target 28 in the path of a Gaussian beam. It will be seen that the quantities discussed above are indicated in FIG. 4 wherein $b_1$, $b_2$ and $b_3$ are the respective confocal parameters, $d_1$, $d_2$, $d_3$ and $d_4$ are the indicated distances, and $w_{01}$, $w_{02}$ and $w_{03}$ are the respective beam waist radii. This notation will be used below in discussing the focussing system of the invention.

Figure 5:
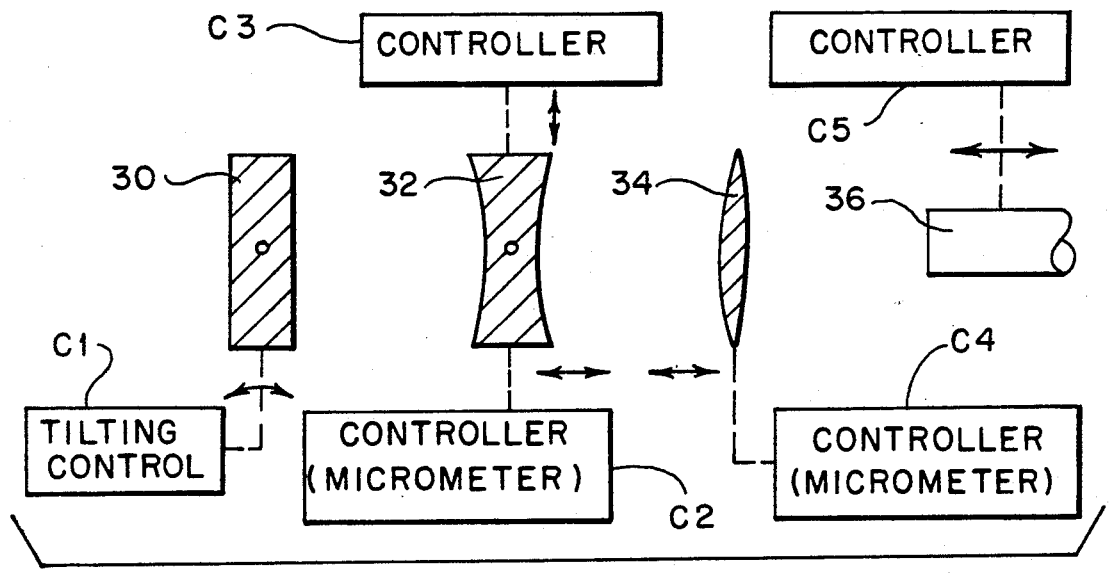
FIG. 5 is a schematic representation of the basic components of the optical positioning and focussing system of the invention.

Referring to FIG. 5, there is provided a schematic representation, not to scale, of the basic components of one preferred embodiment of the beam focussing system of the invention. The illustrated embodiment comprises a window 30, a first lens 32 which can be a positive or negative and is shown as a negative lens (although an embodiment employing a positive lens is considered below in describing the operation of the invention), and a second, positive lens 34. As illustrated, the overall system also includes a target 36 which, in this embodiment, is an optical fiber. The window 30 essentially comprises a glass substrate with flat, parallel surfaces and, in an illustrative example, had a thickness of 1 inch. In this example, lens 32 comprised a 100 mm focal-length lens, lens 34 a 20× microscope objective lens and target 36 a polarization-preserving optical fiber with a 3 micron core. Considering this specific example further, the confocal parameter $b_1$ of the incoming laser was about 8500 mm, the waist distance $d_1$ in front of lens 32 was about 2000 mm, and the spacing between lens 32 and 34 was about 240 mm. It should be noted that the position or placement of window 30 is not critical so long as window 30 is positioned in front of the first lens 32.

In FIG. 5, a series of mechanical controllers for controlling the movement of the basic components of the system are represented by blocks C1, C2, C3, C4 and C5. The functions of these controllers or control devices will be described below and as will be apparent from that description, all of the controllers illustrated will not normally be necessary, depending on the embodiment of the invention. Moreover, it will be understood that separate controllers need not be employed in some instances, i.e., two or more controllers can be part of a single control unit.

Figure 6:
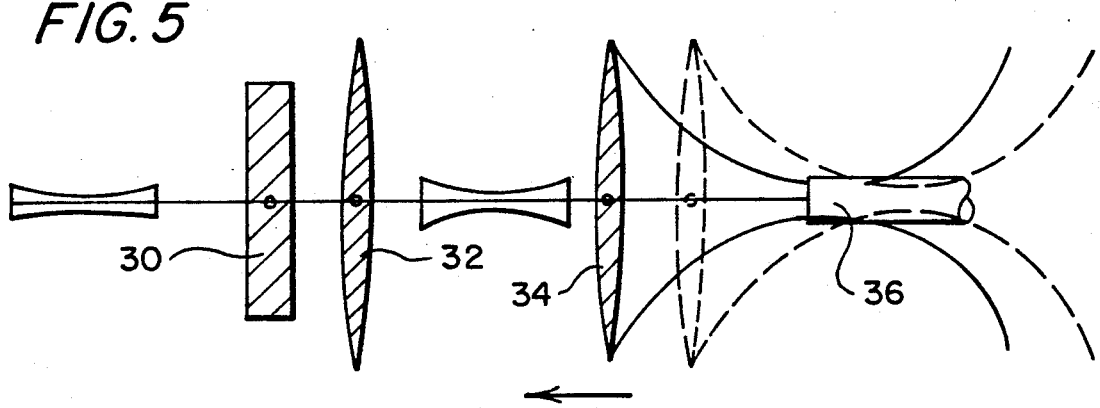
FIGS. 6, 7(a), 7(b), 8(a) and 8(b) are representations similar to that of FIG. 5 (with one minor change discussed below) used in explaining the operation of the invention in providing the most important of the seven adjustments referred to above.

Considering the operation of the system of the invention in providing the seven adjustments described above in connection with FIGS. 6, 7(a) and 7(b), and (8(a) and 8(b), which, as noted above, employ a positive lens for lens 32, and considering first the beam polarization adjustment (adjustment (i) above), adjustment of beam polarization has been found to be a trivial demand that could be satisfied during the initial setup of the system. In this regard, sufficiently high extinction ratios (over 100) have been readily obtained when the beam and polarization planes are aligned within ±5 degrees. As a consequence, no further adjustment of the polarization planes either optically or mechanically is required.

Turning now to the beam waist diameter adjustment (adjustment (ii) above), adjustment of the diameter of the beam waist at the target 36 is needed in order to optimize the diameter of the beam at the face of the target. From equations (4) and (5) above, it follows that:

$$\left(\frac{W_o^1}{W_o^2}\right)^2 = \left(\frac{d_1}{f} - 1\right)^2 + \left(\frac{b_1}{2f}\right)^2 \quad (8)$$

It will be understood that applications requiring a substantial reduction in the size of the beam waist will generally require the use of a lens having a short focal length. Therefore, assuming a demagnification of $W_{01}/W_{02} > 1$ (and, in this regard, it can be expected that $W_{01}/W_{02} \approx 10^3$ when a laser beam is launched into a single-mode fiber) and assuming $b_1 > f$ (which implies that the input beam appears, to the lens, to be highly collimated), it will be seen that $d_1/f > 1$, if the second term of equation (8) above is to have any measurable contribution. In other words, in order to make an adjustment in the size of the transformed beam waist ($W_{02}$ of FIG. 4), and assuming that only a single transfer lens is used, a very large change in $d_1$ is needed (i.e., $d_1 \approx b_1$). However, if the transformation of the beam waist is performed in two steps, i.e., using two lenses 32 and 34, as provided in accordance with the present invention, the demagnification imposed by each of the two lens is reduced and a favorable increase in size sensitivity to the lens position can be achieved by, referring to FIG. 6, varying the distance between lenses 32 and 34. For example, the latter can be accomplished with good precision using a standard resolution micrometer, which is represented by block C2 of FIG. 5, to move lens 32 with respect to lens 34. Alternatively, variation in the separation between lenses 32 and 34 can be achieved by moving lens 34 and target 36, collectively, with respect to lens 32. This can be accomplished, for example, using controllers C4 and C5 of FIG. 5 or a further suitable controller providing ganged movement of the two components.

It is noted that although, with the technique discussed above, the waist sizing sensitivity to lens position has been increased to give some practical measure of control, the sensitivity is nevertheless intentionally limited in order to decouple, to a large extent, the primary task of lens 34 (which, as explained below, is to position the final waist along the optical axis) from the influence of that lens (lens 34) on the size of the final waist.

Considering now the coaxial waist position adjustment (adjustment (iii) above), and referring again to FIG. 5, this adjustment is required so as to make the final beam waist coincident with the input face of the optical fiber 36. This adjustment can be accomplished by leaving the position of the final waist provided by lenses 32 and 34 fixed, and moving the fiber 36 along the optical axis, by e.g., using controller C5. Alternatively, the second lens 34 can be moved (e.g., by controller C4) without affecting the final waist size significantly and this movement is what is shown in dashed lines in FIG. 6. This is another advantage of a two-lens system in that in a single-lens system there would be a first order interaction between the transformed size and position adjustment of the beam waist. In the illustrative example referred to above, the spacing between lenses 32 and 34 can be changed by 25 mm without changing the waist size at the target by more than 1 μm. Whether the lens 34 or the target 36 is involved, an axial positioning resolution on the order of 2% of the confocal parameter ($b_3$ on FIG. 4) is seen to be adequate. This was demonstrated using a system in accordance with the illustrative example set forth above, which has an input confocal parameter of 50 μm and an axial translation resolution of about 1 μm.

Figure 7A:
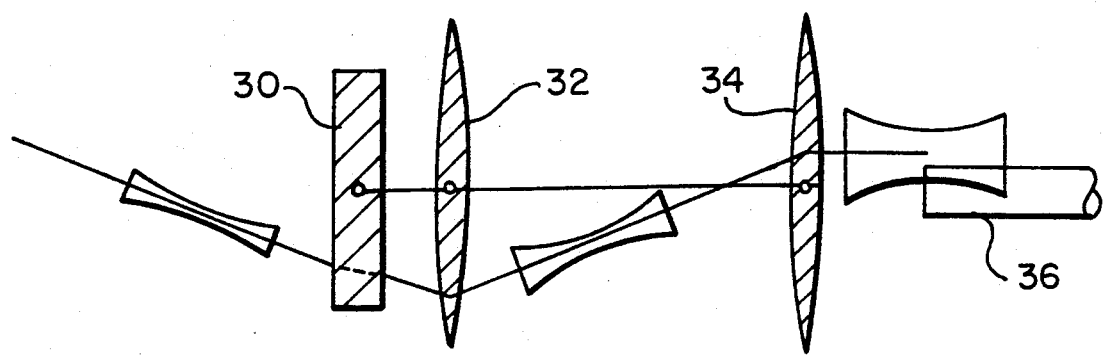
Figure 7B:
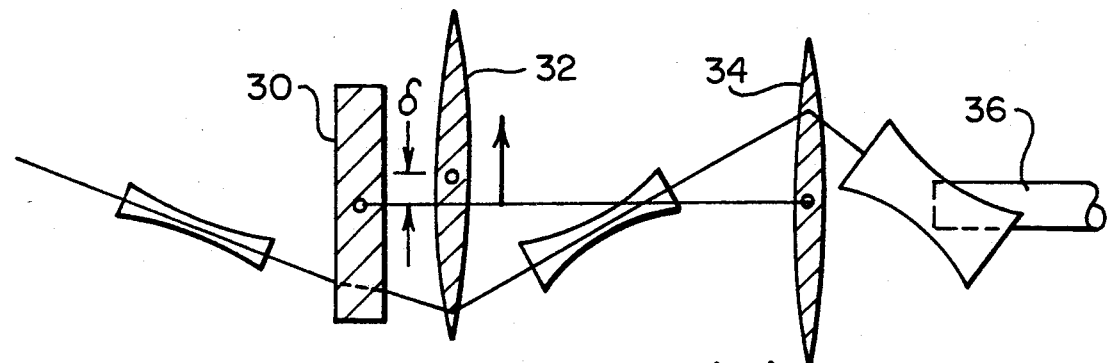

Adjustments (iv) and (v) above, i.e., adjustments in the transverse waist positioning are required to bring the beam into alignment with the optical axis of the fiber. This adjustment is illustrated in FIGS. 7(a) and 7(b) and can, for example, be accomplished using controller C3 of FIG. 5. In particular, a transverse movement of lens 32 by an amount $\delta$ as shown in FIG. 7(a) will cause the target waist to move an amount $\delta'$ in proportion to the ratio of the distances $d_4$ to $d_3$, wherein:

$$\delta' = \frac{d_4}{d_3} \delta \qquad (9)$$

It will be understood that the closer the target waist is to the focal plane $f_2$, the more precise the above relation becomes. When the target 36 is outside of the focal plane, the exact displacement $\delta'$ depends on the spacing between lenses 32 and 34 as well as the distance between the target waist and the focal plane. It will be appreciated that the two lens system of the invention offers significant optical leverage, enabling the mechanical resolution required for the transverse movement of lens 32 to be damagnified by the factor ($d_4/d_3$). In the exemplary embodiment referred to previously, ($d_4/d_3$)~0.1 so that a mechanical resolution of about 1μm is sufficient for transverse positioning of the final waist. The focal length $f_1$ is chosen such that the value of $b_2$ will be at least 100 times larger than the value of $b_3$ that is desired. The value of $d_3$ is set such that it is at least 10 times $f_2$ and such that it is suitable to achieve the desired value of $b_3$.

Figure 8A:
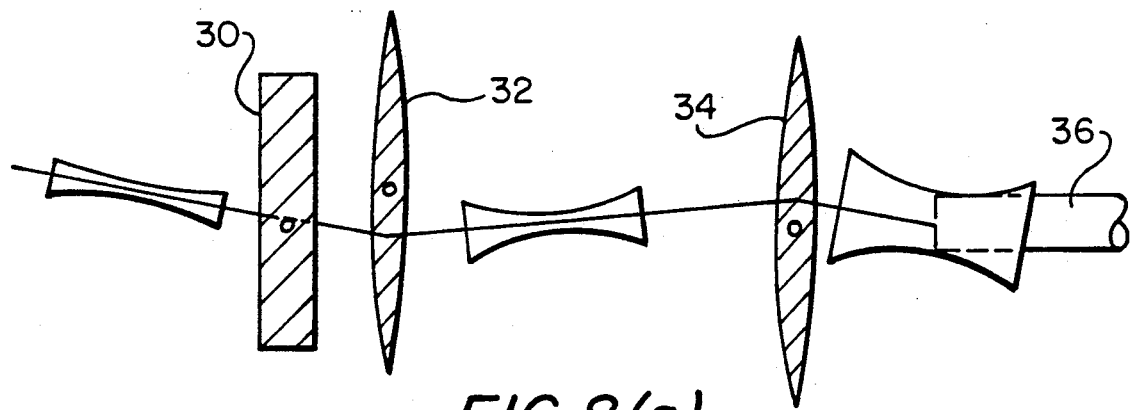
Figure 8B:
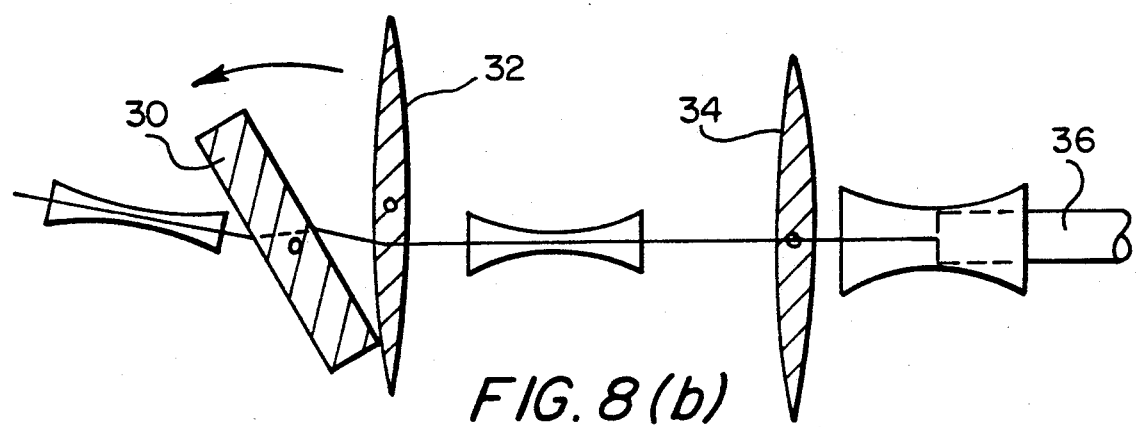

Angular waist adjustments (adjustments (vi) and (vii) above) are required to establish a perpendicular orientation of the beam with respect to the plane of the target. In this regard, the transverse alignment adjustment can degrade the angular adjustment as shown in FIG. 7(b). This also is shown in FIG. 8(a). However, as shown in FIG. 8(b), this is easily corrected with parallel deflection of the beam through the window 30, i.e., by tilting window 30 as shown. Such tilting or pivoting of window 30 can be accomplished, e.g., by using rotation controller C1 of FIG. 5. In order to make an angular correction without affecting the target waist position, it is necessary that $b_1 > f_1$ and $|d_3 - f_2| > b_2$. Under these conditions, geometric optics can be used to show that parallel excursions of the beam into lens 32 will change the tilt of the waists on either side of lens 34 (at locations $d_3$ and $d_4$ of FIG. 4) without changing the axial position of the intermediate waist.

Assuming that the window 30 is a glass block or slab with a thickness t, simple geometric arguments show that a window tilt of $\phi$ results in a waist tilt at the target of $\phi'$ $$\phi' = \frac{td_3}{3f_1 d_4} \phi \qquad (10)$$

To summarize the adjustments provided, correct beam-polarization orientation and input waist diameter are readily established during the initial setup of the fiber and optical elements. Because the beam from the laser is composed of nearly parallel light (and hence $b_1$ of FIG. 4 is quite large), equation (6) indicates that the waist $W_{02}$ will be located almost exactly at $d_2 = f_1$. To satisfy the conditions that will permit the treatment of the Gaussian beams with geometric equations, the distance between lenses 32 and 34 should be such as to approximately satisfy the equation:

$$d_2 + d_3 \gtrsim f_1 + 10 f_2$$

Moreover, because the beam waist $W_{03}$ is located near to focal plane $f_2$, the target should be positioned near $f_2$.

Briefly considering the operation of the focussing system of the invention in accordance with one preferred mode of operation, to initiate alignment of the beam on the target, the fiber 36 is roughly positioned, as desired, in both the axial and transverse directions. Lens 34 is then adjusted axially to more precisely place the final beam waist in the plane of the face of fiber 36 as is shown generally in FIG. 6. Lens 32 is adjusted transversely to cause the beam to more precisely intersect with the fiber 36 as is shown generally in FIGS. 7(a) and 7(b). The window 30 is then tilted as shown in FIG. 8(b) so that the beam is perpendicular to the face of the fiber 36. Finally, the axial, transverse, and angular adjustments are repeated to further refine the alignment.

Turning now to a consideration of alternative embodiments of the invention, it will be understood that the functions performed by lenses 32 and 34 can also be performed by other similar optical elements or devices such as focussing mirrors or catadioptric devices. Further, the function of the slab or block of glass forming window 30 could also be satisfied by reflecting the light beam off of two mirrors held in parallel and capable of being rotated as a pair. In addition, as discussed above, the function performed by lens 32, which is shown as a positive lens in FIGS. 6, 7(a), 7(b), 8(a) and 8(b), could be fulfilled by a negative lens such as that illustrated in FIG. 5. It will be appreciated that the latter embodiment would result in a somewhat more compact construction.

Although the present invention has been described relative to specific exemplary embodiments thereof, it will be understood by those skilled in the art that variations and modifications can be effected in these exemplary embodiments without departing from the scope and spirit of the invention.

We claim:

1. A beam focusing and positioning apparatus for focusing and positioning the waist of a Gaussian beam at a desired location on a target, said apparatus comprising:

a first optical focusing means, disposed in the path of an incoming beam and through which said beam passes;

a second optical focusing means, disposed downstream of said first optical focusing means and through which said beam passes after passing through said first optical focusing means, for, in cooperation with said first optical focussing means, providing a desired lateral displacement of the waist of the beam such that the final waist of the beam is focussed on said target; and rotatable optical means, disposed upstream of said first optical focusing means, for adjusting the angular orientation of the final waist of the beam at said target by a parallel displacement of the beam at said rotatable optical means wherein the beam exiting the rotatable optical means is parallel to the beam entering the rotatable optical means.

2. An apparatus as claimed in claim 1 wherein said first optical focusing means comprises a first lens and means for adjusting the transverse position of the lens relative to the axis of the incoming beam to control the transverse position of the final waist of the beam relative to the target.

3. An apparatus as claimed in claim 2 wherein said second focusing means comprises a second lens and said apparatus comprises means for adjusting the spacing between said first and second lenses to control the diameter of the final waist of the beam at the target.

4. An apparatus as claimed in claim 3 wherein said means for adjusting the spacing between said first and second lenses comprises means for moving said first lens axially with respect to said second lens.

5. An apparatus as claimed in claim 4 wherein said apparatus includes means for moving said second lens relative to said first lens to control the axial position of the final waist of the beam relative to said target.

6. An apparatus as claimed in claim 5 wherein said means for moving said second lens comprises a micrometer device.

7. An apparatus as claimed in claim 2 wherein said first lens comprises a positive lens.

8. An apparatus as claimed in claim 2 wherein said first lens comprises a negative lens.

9. An apparatus as claimed in claim 1 wherein said rotatable optical means comprises a pair of parallel surfaces which are rotated together.

10. An apparatus as claimed in claim 9 wherein said parallel surfaces comprise the opposed planar surfaces of an optical window member.

11. An apparatus as claimed in claim 10 wherein said optical window member comprises a block of glass.

12. An apparatus as claimed in claim 1 wherein said first and second optical focusing means comprises first and second lenses having respective focal planes $f_1$ and $f_2$ and wherein the spacing between said lenses is at least equal to $f_1 + 10f_2$.

13. An apparatus as claimed in claim 1 wherein said first and second optical focusing means comprise lenses and wherein the target is disposed at least near to the focal plane of the second lens.

14. An apparatus as claimed in claim 1 wherein said first and second optical focusing means comprise first and second lenses and the absolute value of the difference between the distance between the intermediate waist and the second lens and the focal length of the second lens is much larger than the confocal parameter $b_2$.

15. A beam focusing and positioning apparatus for focusing and positioning waist of a Gaussian beam at a desired location on a target, said apparatus comprising:

a first optical focusing device, disposed in the path of an incoming beam and through which said beam passes, for focusing the intermediate waist of the beam;

a second optical focusing device, disposed downstream of said first optical focusing device and through which said beam passes after passing through said first optical focusing device, for focusing the final waist of the beam on said target;

rotatable optical means disposed upstream of said first optical focusing device, for adjusting the angular orientation of the final waist of the beam on said target by parallel displacement of the beam at said optical means wherein the beam exiting from the rotatable optical means is parallel to the beam entering the rotatable optical means; and control means for varying the transverse position of said first optical focusing device relative to said beam to control the transverse position of the beam relative to the target and for varying the relative axial positions of said devices and said target to control the diameter of the waist of said beam and the axial position of the final waist of said beam relative to said target.

16. An apparatus as claimed in claim 15 wherein said first and second focusing devices comprise first and second lenses, wherein said second lens comprises a positive lens, and wherein said control means includes means for varying the spacing between said lenses to control the diameter of the final waist of said beam at said target.

17. An apparatus as claimed in claim 16 wherein said control means further comprises means for moving said second lens relative to said first lens to control the axial position of the final waist of the beam relative to said target.

18. An apparatus as claimed in claim 17 wherein said means for varying the spacing between said lenses comprises means for axially moving said first lens.

19. A beam focusing and positioning apparatus for focusing and positioning the final waist of a gaussian beam at a desired location on a target, said apparatus comprising:

a first lens, having a focal plane $f_1$, disposed in the path of an incoming beam and through which said beam passes;

a second lens, having a focal plane $f_2$ and being spaced downstream from said first lens by a distance at least equal to $f_1 + 10f_2$, for cooperating with said first lens to focus the final waist of the beam on said target;

rotatable optical means, disposed upstream of said first lens, for adjusting the angular orientation of the final waist of the beam by parallel displacement of the beam at said optical means;

first control means for varying the transverse position of said first lens relative to the axis of said beam to control the transverse position of the final waist of said beam relative to said target; and further control means for varying the relative axial positions of said lenses to control the diameter of the final waist of the beam and to control the axial position of the final waist of said beam.

20. An apparatus as claimed in claim 19 wherein said further control means includes means for varying the spacing between said lenses to control the diameter of the final waist of said beam at said target and means for moving said second lens relative to said first lens to control the axial position of the final waist of the beam relative to said target.

* * * * *